US010085903B1

(12) United States Patent
Ludovici et al.

(10) Patent No.: US 10,085,903 B1
(45) Date of Patent: Oct. 2, 2018

(54) ANGLE ADJUSTMENT ASSEMBLY

(71) Applicant: Ki Mobility, Stevens Point, WI (US)

(72) Inventors: Alan Ludovici, Stevens Point, WI (US); Thomas J. Whelan, Stevens Point, WI (US)

(73) Assignee: Ki Mobility, Stevens Point, WI (US)

( * ) Notice: Subject to any disclaimer, the term of this patent is extended or adjusted under 35 U.S.C. 154(b) by 162 days.

(21) Appl. No.: 15/210,869

(22) Filed: Jul. 14, 2016

(51) Int. Cl.
*A61G 5/10* (2006.01)
*B60B 33/04* (2006.01)

(52) U.S. Cl.
CPC ............... *A61G 5/10* (2013.01); *B60B 33/04* (2013.01); *B60G 2200/464* (2013.01); *Y10T 16/182* (2015.01)

(58) Field of Classification Search
CPC ....... A61G 5/10; F16L 27/023; Y10T 16/182; Y10T 16/1943; B60B 33/0068; B60B 33/04; B60B 33/0065; B60G 2200/464; B60G 2200/46; B62D 17/00
See application file for complete search history.

(56) References Cited

U.S. PATENT DOCUMENTS

| | | | | |
|---|---|---|---|---|
| 144,530 A | * | 11/1873 | Glad ...................... | B60B 33/04 16/100 |
| 1,162,627 A | * | 11/1915 | McAllister .............. | B60B 33/04 16/19 |
| 1,343,758 A | * | 6/1920 | Herbert ................... | B60B 33/04 16/18 R |
| 1,423,700 A | * | 7/1922 | Van Meter .............. | B60B 33/04 16/19 |
| 1,429,383 A | * | 9/1922 | Warner .................... | A47L 5/34 15/354 |
| 1,835,144 A | * | 12/1931 | Cleaveland ............. | B60B 33/04 16/34 |
| 1,922,099 A | * | 8/1933 | Kilian ................. | B60B 33/0002 16/38 |
| 2,425,675 A | * | 8/1947 | Graff ....................... | B60B 33/04 16/19 |
| 2,879,075 A | * | 3/1959 | Wallace .................. | B60B 33/06 16/19 |
| 3,034,810 A | * | 5/1962 | Primean .............. | F16C 11/0619 280/86.756 |

(Continued)

*Primary Examiner* — Joseph M Rocca
*Assistant Examiner* — Timothy Wilhelm
(74) *Attorney, Agent, or Firm* — Thedford I. Hitaffer; Hitaffer & Hitaffer, PLLC

(57) ABSTRACT

An angle adjustment assembly comprises a first member configured to pivot about a first axis. A second member is configured to rotate about a second axis transverse to the first axis. The first member is eccentrically supported in relation to the second member so that rotation of the second member produces pivotal movement of the first member. A third member may be configured to rotate about a third axis transverse to the first axis. The second member may be eccentrically supported in relation to the third member so that rotation of the third member further produces pivotal movement of the first member. The second member may comprise an inner cam member. The third member may comprise an outer cam member. The first member may be a caster stem for supporting a wheelchair caster assembly, or alternatively, an axle receiver for supporting an axle of a wheelchair drive wheel.

13 Claims, 11 Drawing Sheets

(56) References Cited

U.S. PATENT DOCUMENTS

| | | | | |
|---|---|---|---|---|
| 3,602,464 | A * | 8/1971 | Orii | B60B 33/04 16/32 |
| 4,509,772 | A * | 4/1985 | Drotar | B62D 17/00 280/86.756 |
| 4,669,146 | A * | 6/1987 | Saito | B60B 33/0002 16/18 A |
| 4,969,232 | A * | 11/1990 | Michel | B60B 33/0002 16/350 |
| 4,970,801 | A * | 11/1990 | Specktor | B62D 17/00 280/86.755 |
| 5,060,962 | A * | 10/1991 | McWethy | A61G 5/10 280/250.1 |
| 5,294,142 | A * | 3/1994 | Weege | A61G 5/10 280/250.1 |
| 5,503,416 | A * | 4/1996 | Aoki | A60B 6/4405 16/35 R |
| 5,851,018 | A * | 12/1998 | Curran | A61G 5/10 280/250.1 |
| 5,971,408 | A * | 10/1999 | Mandel | B60B 33/06 248/188.4 |
| 6,113,117 | A * | 9/2000 | Mimura | A61G 5/023 280/250.1 |
| 6,302,416 | B1 * | 10/2001 | Schmack | B60G 15/07 280/86.75 |
| 6,871,379 | B2 * | 3/2005 | Ebeling | B60B 33/018 16/19 |
| 6,886,216 | B2 * | 5/2005 | Graham | A47B 91/028 16/19 |
| 7,083,176 | B2 * | 8/2006 | Soles | B60G 7/02 280/86.751 |
| 7,210,693 | B2 * | 5/2007 | Ingalls | B62D 17/00 280/86.756 |
| 7,231,689 | B2 * | 6/2007 | Scheiber | A61G 5/10 16/18 R |
| 7,353,566 | B2 * | 4/2008 | Scheiber | B60B 33/04 16/18 R |
| 7,513,514 | B1 * | 4/2009 | Schlosser | B60G 7/005 280/86.751 |
| 7,520,518 | B2 * | 4/2009 | Peterson | A61G 5/00 280/250.1 |
| 8,042,824 | B2 * | 10/2011 | Borisoff | A61G 5/1097 280/250.1 |
| 8,256,786 | B2 * | 9/2012 | Ludovici | A61G 5/10 16/18 R |
| 8,424,887 | B1 * | 4/2013 | LeMeur, Jr. | B60B 33/04 16/18 R |
| 8,469,375 | B2 * | 6/2013 | Frens | B60G 3/06 280/86.753 |
| 8,573,613 | B2 * | 11/2013 | Liu | A61H 3/04 16/20 |
| 8,839,487 | B2 * | 9/2014 | Plate | B60B 33/04 16/32 |
| 9,168,785 | B2 * | 10/2015 | Spektor | B60B 33/0076 |
| 9,186,944 | B2 * | 11/2015 | Luttinen | B60G 3/04 |
| 9,233,589 | B1 * | 1/2016 | Miller | B60G 7/02 |
| 9,782,640 | B2 * | 10/2017 | Moore | A63B 53/02 |
| 9,901,787 | B2 * | 2/2018 | Boggs | A63B 53/02 |
| 2007/0102894 | A1 * | 5/2007 | Derisi | B60G 7/008 280/86.751 |
| 2008/0209673 | A1 * | 9/2008 | Cooper | B60B 33/0005 16/45 |
| 2010/0132156 | A1 * | 6/2010 | Morris | B60B 33/045 16/19 |
| 2012/0091299 | A1 * | 4/2012 | Levine | A47B 91/022 248/188.4 |
| 2016/0059628 | A1 * | 3/2016 | Degrace | B60B 33/0068 16/35 R |

* cited by examiner

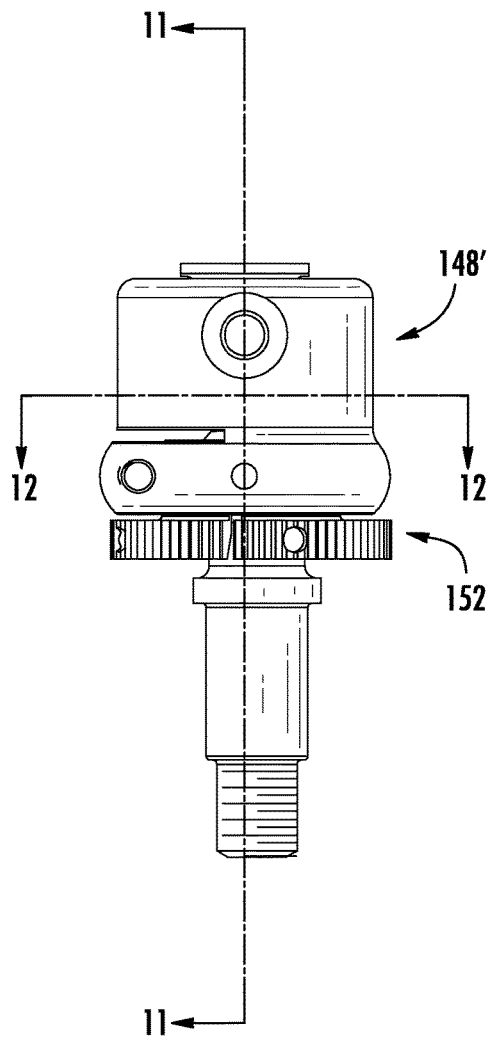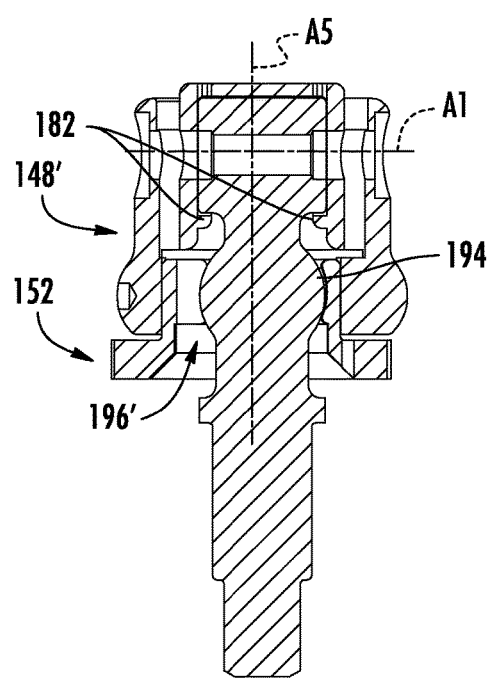
FIG. 10
FIG. 11

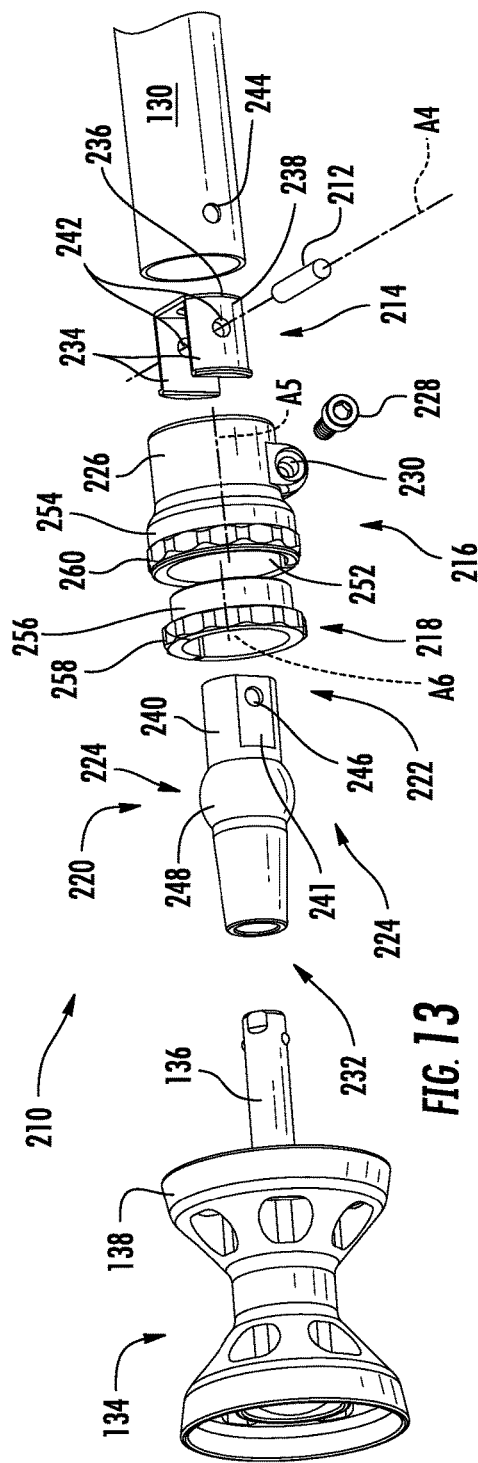
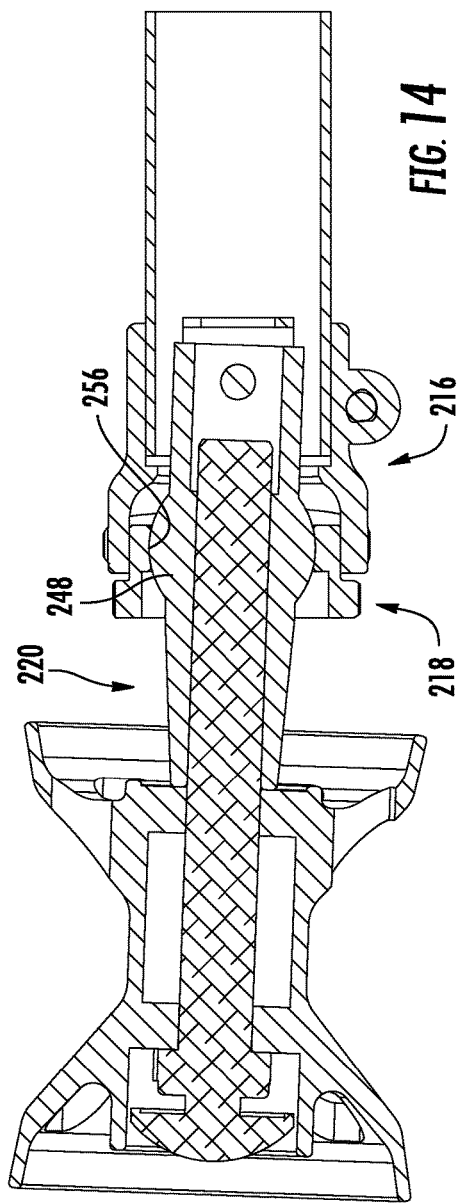
FIG. 13
FIG. 14

ANGLE ADJUSTMENT ASSEMBLY

BACKGROUND OF THE INVENTION

This invention relates in general to angle adjustment assemblies and more particularly, to angle adjustment assemblies for wheelchairs and components therefor.

Angle adjustment of components is often necessary for proper fit of the components. This particularly holds true for wheelchairs and components therefor. Most frequently, wheelchairs and components therefor have to be properly adjusted to fit the user. Adjustments in wheelchairs and components therefor may even be made depending on the use of the wheelchairs. For example, the camber angle of rear or drive wheels is frequently adjusted to lower the profile of a wheelchair and provide a wider footprint to improve stability, lower rolling resistance, and better control at higher speeds, especially when the wheelchair is used in para-athletic events. However, a wide footprint may be unsuitable in a narrow environment. In these cases, the camber angle may be adjusted to narrow the footprint of the wheelchair to allow the wheelchair to be navigated through narrow pathways, and to reduce strain on wheel bearings.

Adjusting the camber angle of the rear wheels tilts the wheelchair frame rearward. Caster assemblies, connected to the front frame, tilt as the frame is tilted. Upon tilting, the caster stem tilts at an angle. This is unacceptable because the caster stem must maintain a true vertical orientation to enable the wheelchair to be properly steered, and to prevent the casters from fluttering. Adjustment in the caster angle is necessary to correct the angle of the caster stem following adjustments in the camber angle of the rear wheels.

An angle adjustment assembly is needed to readily and accurately adjust angles, especially when making such adjustments in wheelchair and components therefor.

SUMMARY OF THE INVENTION

This invention relates to an angle adjustment assembly comprising a first member configured to pivot about a first axis, and at least a second member configured to rotate about a second axis transverse to the first axis. The first member is eccentrically supported in relation to the second member so that rotation of the second member produces pivotal movement of the first member.

The angle adjustment assembly may further comprise at least a third member configured to rotate about a third axis transverse to the first axis. The second axis does not align with the third axis. Additionally, the second member is eccentrically supported in relation to the third member so that rotation of the third member further produces pivotal movement of the first member.

The second member may comprise an inner cam member and the third member may comprise an outer cam member. The inner cam member may be in a nesting relationship with the outer cam member.

The first member may be a caster stem for supporting a wheelchair caster assembly.

Alternatively, the first member may be an axle receiver for supporting an axle of a wheelchair drive wheel.

Various advantages of this invention will become apparent to those skilled in the art from the following detailed description of the preferred embodiment, when read in light of the accompanying drawings.

BRIEF DESCRIPTION OF THE DRAWINGS

FIG. 10 is a side elevational view of the angle adjustment assembly shown in FIG. 9 in an assembled condition.

FIG. 11 is a cross-sectional view of the angle adjustment assembly taken along the line 11-11 in FIG. 10.

FIG. 13 is an exploded perspective view of an angle adjustment assembly for adjusting the camber angle or rear wheels.

FIG. 14 is a sectional view of the angle adjustment assembly shown in FIG. 14 in an assembly condition.

DETAILED DESCRIPTION OF THE PREFERRED EMBODIMENT

Figure 1:
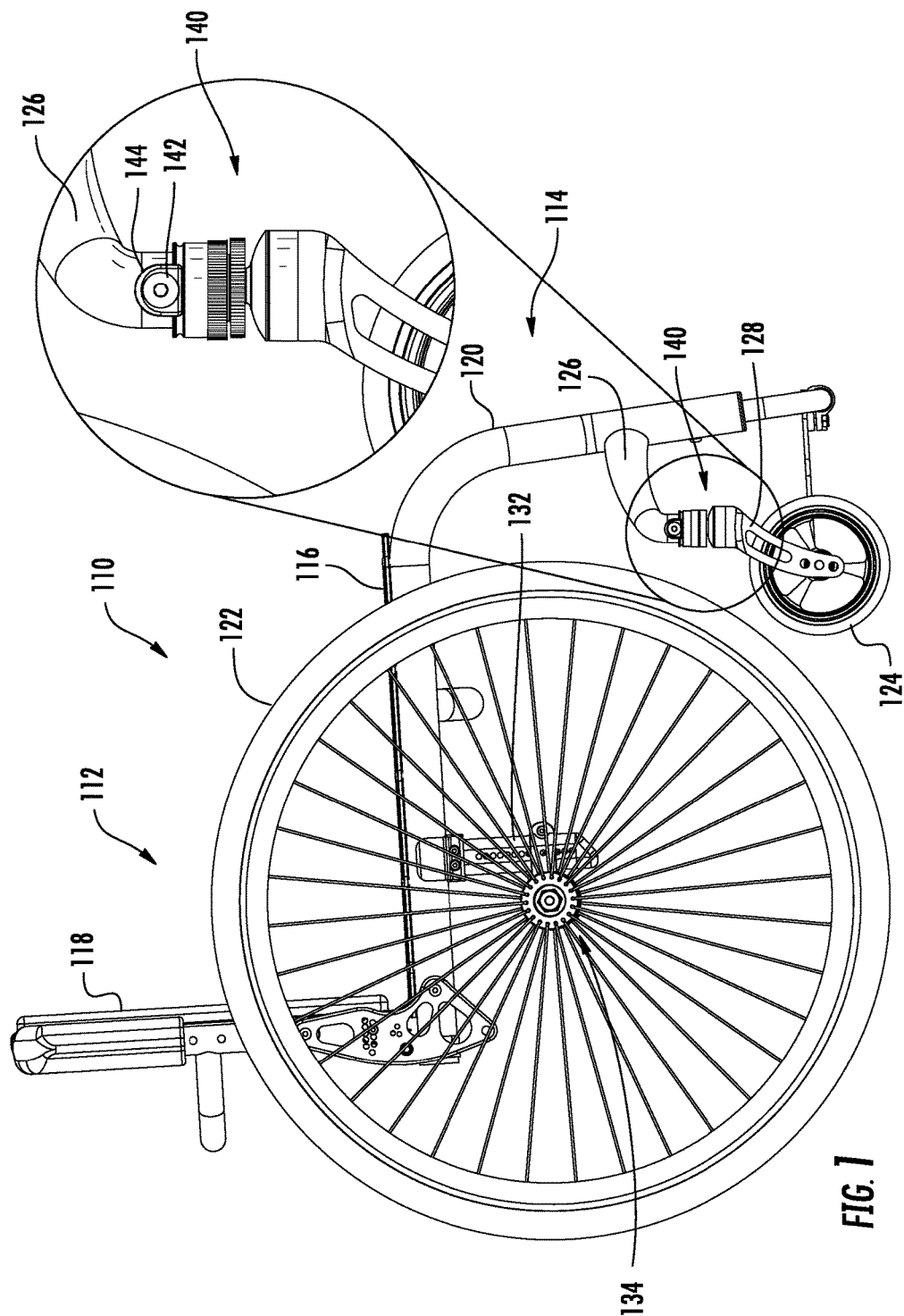
FIG. 1 is a side elevational view of a wheelchair having angle adjustment assemblies for adjusting the angle of wheelchair components, together with an enlarged view of detail A, showing an angle adjustment assembly for caster assemblies.

Referring now to the drawings, there is illustrated in FIG. 1 a manual wheelchair 110. The wheelchair 110 comprises a seat 112 supported by a frame 114. The seat 112 comprises a seat panel 116 and a back panel 118, which span opposing side frames 120. The seat and back panels 116, 118 may be pliable to allow the wheelchair 110 to be folded into a compact configuration for transport and storage. The frame 114 is configured to be supported for movement in relation to a supporting surface by wheels, including rear wheels 122 and caster wheels 124. The rear wheels 122 are configured to be driven to propel the wheelchair 110. The caster wheels 124 are configured to swivel to promote steering of the wheelchair 110.

The present invention relates to an angle adjustment assembly configured for use with wheelchair component parts. An exemplary angle adjustment assembly 140 for supporting a caster wheel 124 is shown in FIG. 1. The angle adjustment assembly 140 is supported in relation to a wing tube 126, which extends from a front portion of the side frame 120. According to the illustrated embodiment, the angle adjustment assembly 140 is mounted to the wing tube 126 via fasteners 142 and keepers or mounting bosses 144. The angle adjustment assembly 140 supports the caster wheel 124 via a caster fork 128, which swivels in relation to the angle adjustment assembly 140.

Figure 2:
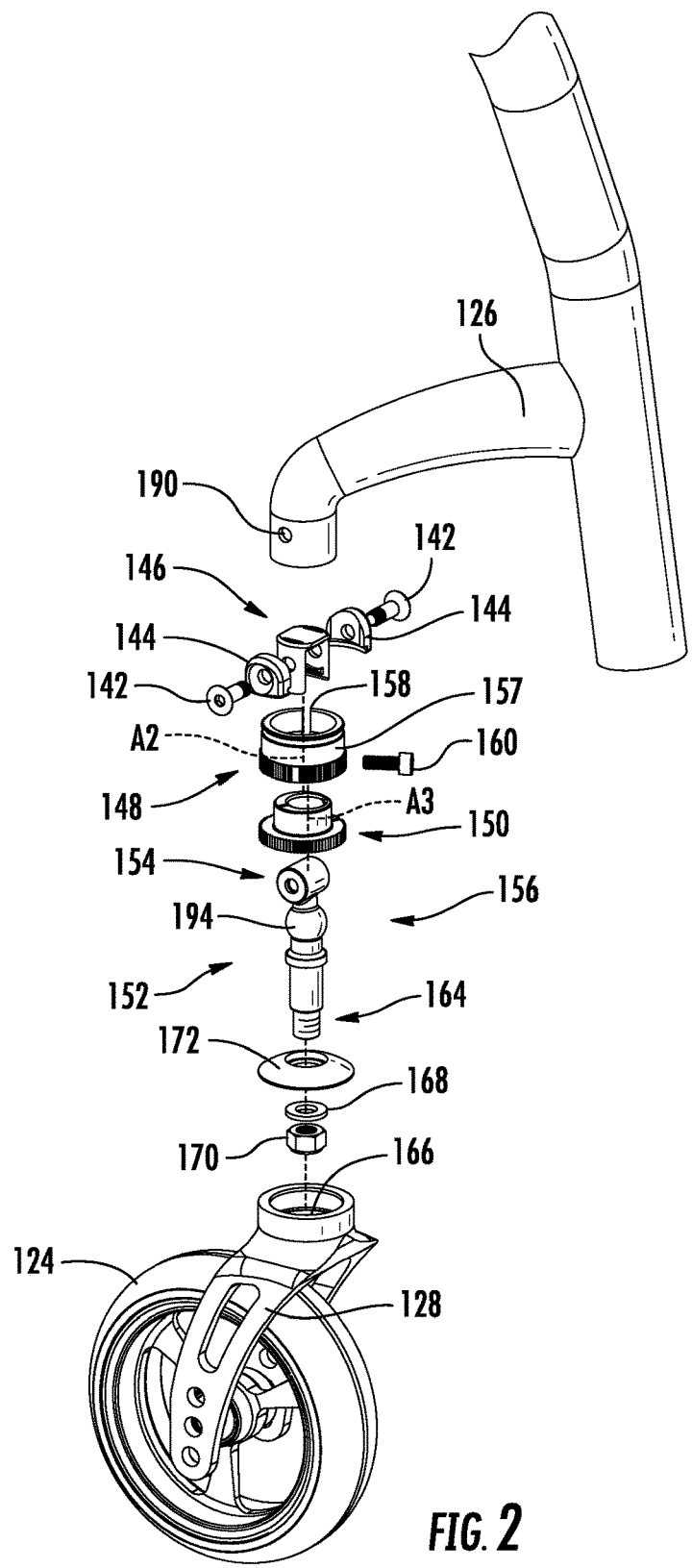
FIG. 2 is an enlarged exploded side perspective view of the angle adjustment assembly, together with a portion of the wheelchair, shown in FIG. 1.

The angle adjustment assembly 140 is shown exploded in FIG. 2. As mentioned above, the angle adjustment assembly 140 is mounted to the wing tube 126 via fasteners 142 and keepers or mounting bosses 144. The angle adjustment assembly 140 comprises a pivot bushing 146, an outer cam member 148, an inner cam member 150, and a caster stem 152 configured to cooperate with the pivot bushing 146 and the cam members 148, 150. The pivot bushing 146 is dimensioned and configured to be inserted within an open end of the wing tube 126. A proximal end, generally indicated at 154, of the caster stem 152 is dimensioned and configured to be supported for pivotal movement within the pivot bushing 146. A medial portion 156 of the caster stem 152 cooperates with the cam members 148, 150 to selectively hold the caster stem 152 at a desired angle.

According to the illustrate embodiment, the outer cam member 148 comprises a one-piece clamping collar 157 having a slot 158 therein. A fastener 160 (e.g., set screw) passes through a non-threaded counter-sunk hole (not shown) in a first side wall portion of the collar 157, traverses the slot 158, and is threaded into a threaded hole in a second side wall portion of the collar 157. Tightening the fastener 160 causes the side (e.g., perimeter) wall of the collar 157 to move radially inward, and thus clamp against the inner cam member 150.

A distal end 164 of the caster stem 152 cooperates with the caster fork 128, which in turn supports the caster wheel 124 for rotation. It should be appreciated that a bearing 166 may be interposed between the caster stem 152 and the caster fork 128 to promote swiveling movement between the caster stem 152 and the caster fork 128. The caster stem 152 may be mounted in relation to the caster fork 128 in a conventional manner, such as with the use of a washer 168 and a fastener 170. A dust cover 172 may be provided for protecting the bearing 166, as is well-known in the art.

Figure 3:
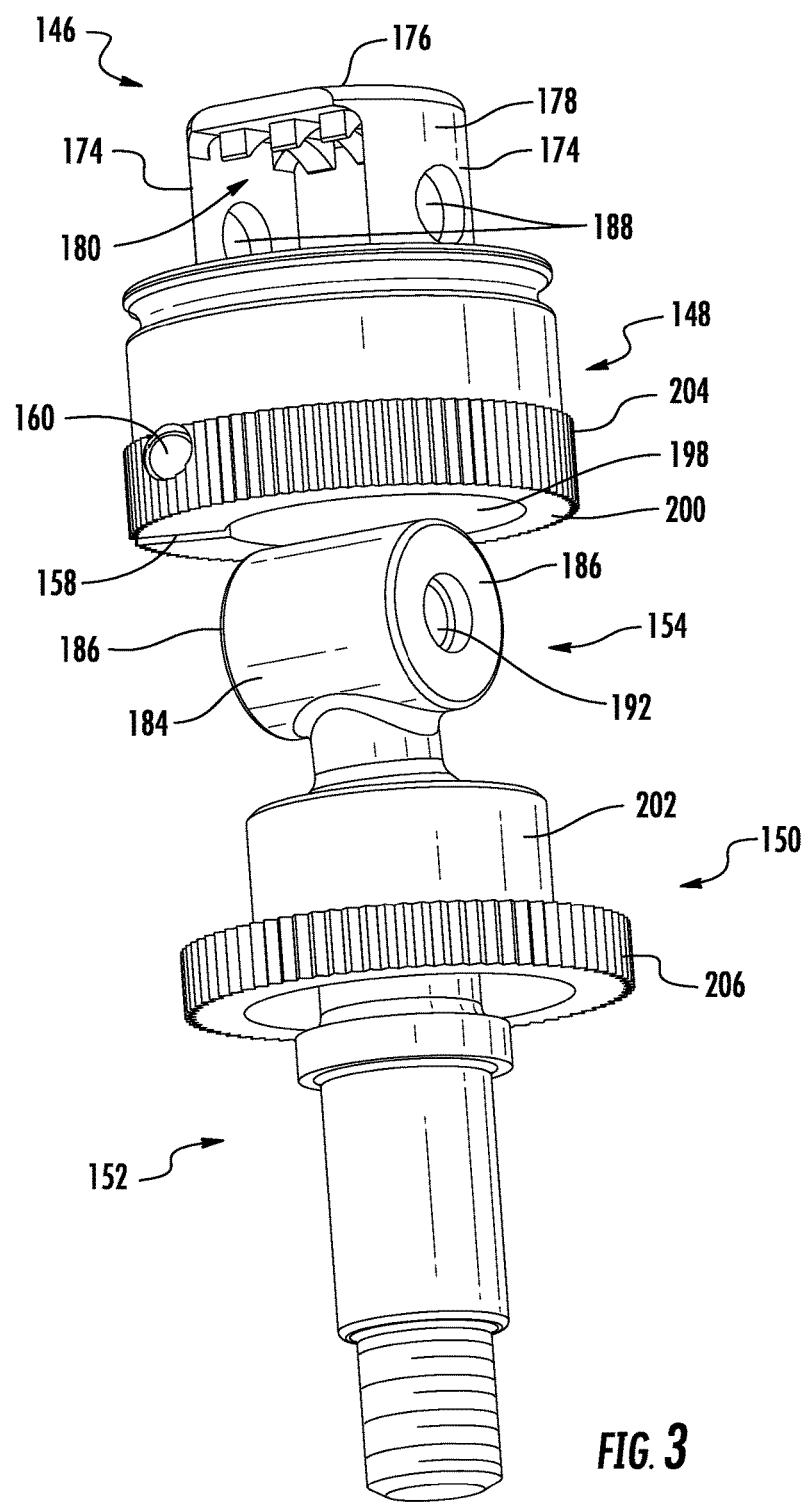
FIG. 3 is an enlarged partially exploded perspective view of the angle adjustment assembly shown in FIGS. 1 and 2.

Now, with reference to FIG. 3, the angle adjustment assembly 140 is shown partially exploded. The illustrated pivot bushing 146 comprises a clevis, comprising a pair of opposing legs 174, joined together by a link or transverse member 176. Each leg 174 comprises an outer surface 178, which may be curved to conform to the inner surface of the wing tube 126, for a snug fit therein.

An underside of transverse member 176 comprises one or more cam surfaces, hereinafter referred to as the first cam surface, generally indicated at 180. Arcuate formations extending inwardly of the opposing legs 174 form cam surfaces, hereinafter referred to as the second cam surface 182 (shown in FIG. 5).

The proximal end 154 of the caster stem 152 comprises a substantially cylindrical-shaped portion 184 with opposing ends 186, which form bearing surfaces for engagement with the opposing legs 174 of the pivot bushing 146. The substantially cylindrical-shaped portion 184 is dimensioned and configured to fit in a space bounded between the opposing legs 174. The substantially cylindrical-shaped portion 184 fits snugly between the opposing legs 174 and engages the cam surface 180.

The first cam surface 180 is dimensioned and configured to engage a proximal end of the substantially cylindrical-shaped portion 184. The second cam surface 182 is dimensioned and configured to engage a distal end of the substantially cylindrical-shaped portion 184. It should be appreciated that the first and second cam surfaces 180, 182 are arranged and configured to cooperatively capture the substantially cylindrical-shaped portion 184 therebetween.

The legs 174 are provided with holes 188, which are arranged and configured to register or align with mating holes 190 (shown in FIG. 2) in opposing walls of the wing tube 126 for passage of the fasteners 142. The substantially cylindrical-shaped portion 184 has a threaded hole 192 passing laterally therethrough. The threaded hole 192 passing through the substantially cylindrical-shaped portion 184 registers or aligns with the holes 188 in the legs 174 of the pivot bushing 146 and further with the holes 190 in the wing tube 126. The fasteners 142 (shown in FIG. 2) pass through respective holes 190 in the wing tube 126 and the holes 188 in the legs 174 of the pivot bushing 146, and are threaded in the threaded hole 192. The fasteners 142 function as a pivot dowel, about which the caster stem 152 may pivot. The caster stem 152 pivots about a lateral axis A1 (shown in FIG. 5).

Figure 5:
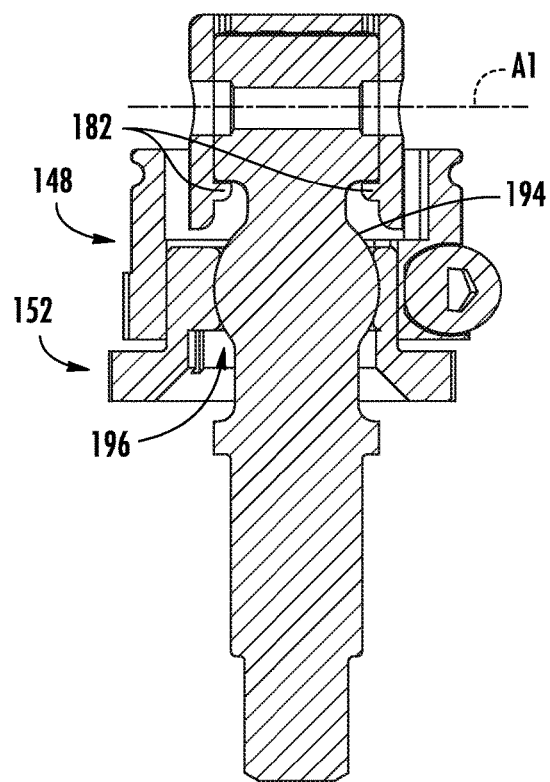
FIG. 5 is a cross-sectional view of the angle adjustment assembly taken along the line 5-5 in FIG. 4.
Figure 6:
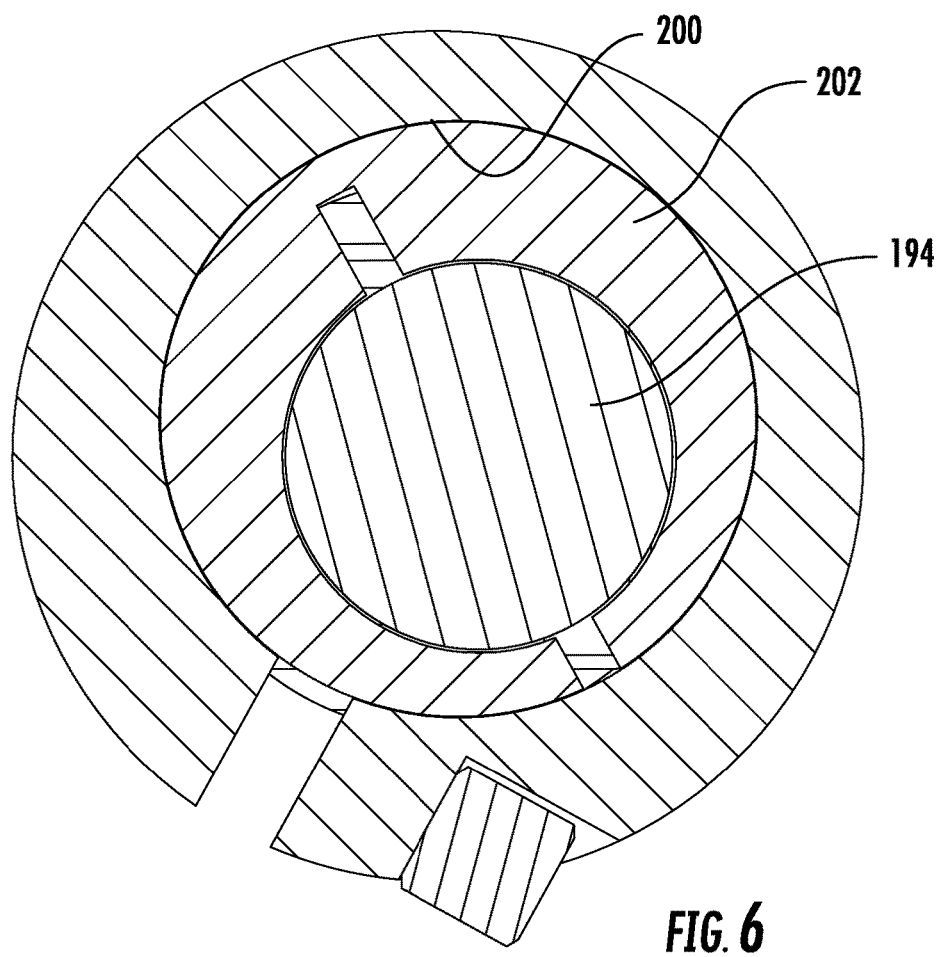
FIG. 6 is a cross-sectional view of the angle adjustment assembly taken along the line 6-6 in FIG. 4 to show an eccentric relationship between parts of the angle adjustment assembly.

The medial portion 156 of the caster stem 152 defines a ball 194 that fits within a socket 196 defined by the inner cam member 150 (shown in FIG. 5). The ball 194 may be press fit into the socket 196. The caster stem 152 and the inner cam member 150 are shown in an assembled condition in FIG. 3.

Figure 4:
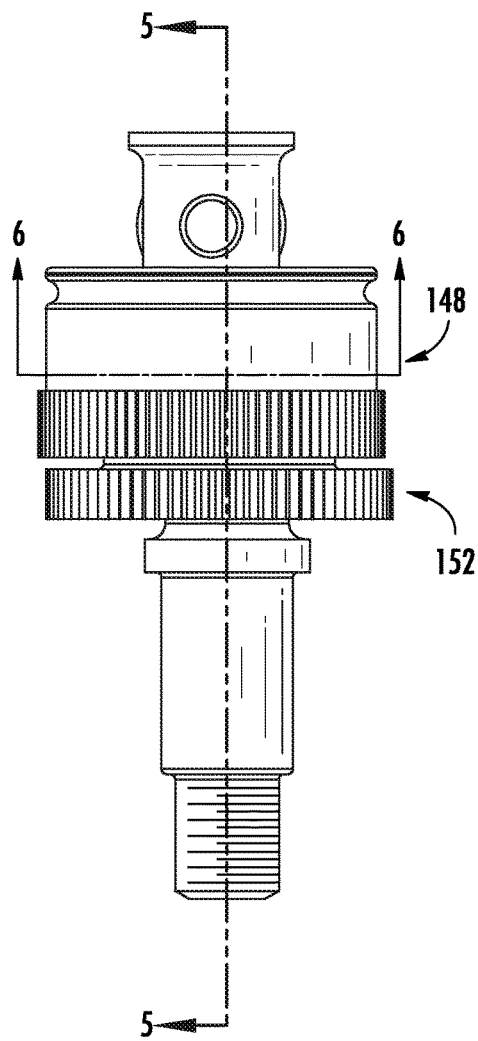
FIG. 4 is a side elevational view of the angle adjustment assembly shown in FIG. 3 in an assembled condition.

The inner cam member 150 nests within the outer cam member 148, as shown in FIGS. 4 and 5. The outer cam member 148 defines an eccentric opening 198 bounded by the perimeter of side wall 200 of the outer cam member 148. The inner cam member 150 comprises an eccentric wall 202. Rotation movement of the outer and inner cam members 148, 150 in relation to one another pivotally displaces the caster stem 152, adjusting the angel in the caster stem 152. The outer and inner cam members 148, 150 may each have associated therewith a thumbwheel, which may comprise a ribbed periphery, generally indicated at 204, 206.

In operation, the set screw 160 is loosened to release the clamping effect of the clamping collar 157. With the set screw 160 loosened, the outer and inner cam members 148, 150 may be rotated in relation to one another. In doing so, the caster stem 152 pivots about the fasteners 142, about a lateral axis A1.

It should be appreciated that the eccentric configuration of the outer and inner cams 148, 150 produces the pivotal movement. That is to say, rotation of the eccentric cam members 148, 150, at least one axis A2, A3 of which is not centered, and which are transverse to the lateral pivot axis A1, results in the pivotal movement of the caster stem 152. Once a desired angle for the caster stem 152 is achieved, the fastener or the set screw 160 is tightened to hold the outer and inner cam members 148, 150 in a fixed relation to one another, thus holding the caster stem 152 in the desired position.

Figure 7:
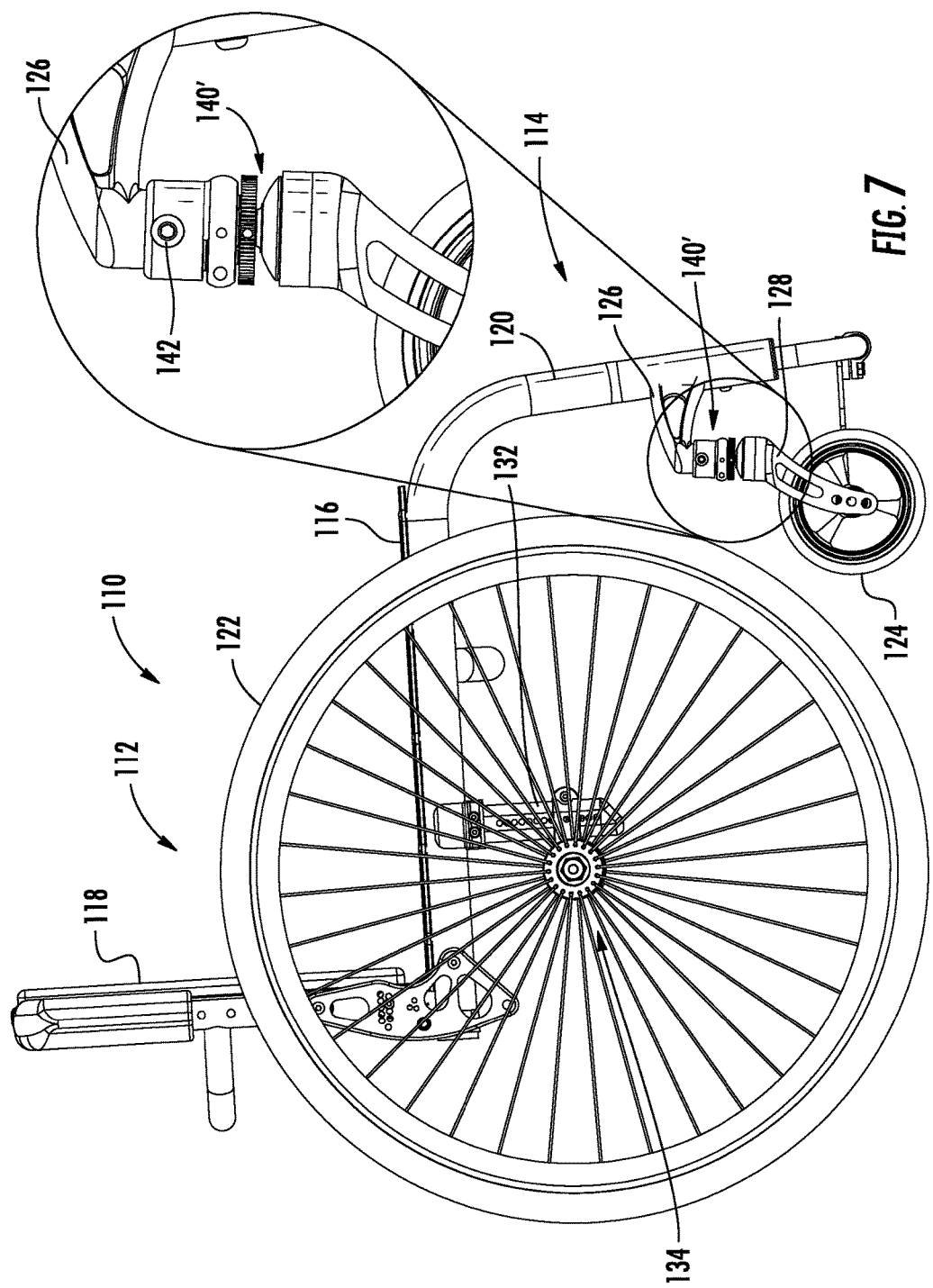
FIG. 7 is a side elevational view of a wheelchair having angle adjustment assemblies for adjusting the angle of wheelchair components, together with an enlarged view of detail A, showing an alternative angle adjustment assembly for caster assemblies.

An alternative angle adjustment assembly 140' is shown in FIG. 7. The angle adjustment assembly 140' is supported in relation to a wing tube 126, which extends from a front portion of the side frame 120 of a wheelchair 110, similar to that described above. According to this embodiment, the angle adjustment assembly 140' is mounted to the wing tube 126 via fasteners 142. The angle adjustment assembly 140' supports the caster wheel 124 via a caster fork 128, which swivels in relation to the angle adjustment assembly 140'.

Figure 8:
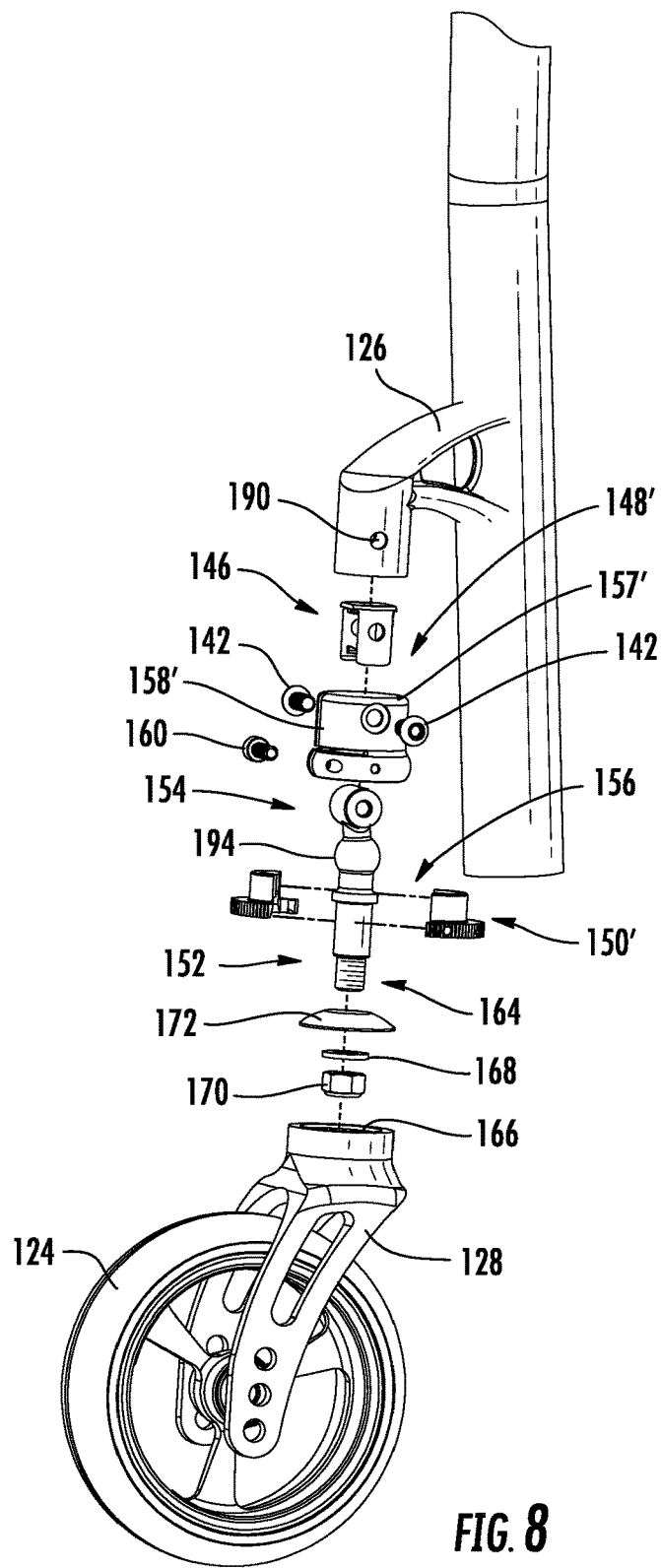
FIG. 8 is an enlarged exploded side perspective view of the angle adjustment assembly, together with a portion of the wheelchair, shown in FIG. 7.

The angle adjustment assembly 140' is shown exploded in FIG. 8. As mentioned above, the angle adjustment assembly 140' is mounted to the wing tube 126 via fasteners 142. The angle adjustment assembly 140' comprises a pivot bushing 146, an outer cam member 148', an inner cam member 150', and a caster stem 152 configured to cooperate with the pivot bushing 146 and the cam members 148', 150'. The pivot bushing 146 is dimensioned and configured to be inserted within an open end of the wing tube 126. A proximal end, generally indicated at 154, of the caster stem 152 is dimensioned and configured to be supported for pivotal movement within the pivot bushing 146. A medial portion 156 of the caster stem 152 cooperates with the cam members 148', 150' to selectively hold the caster stem 152 at a desired angle.

The outer cam member 148' comprises a one-piece clamping collar 157' having a slot 158' therein. A fastener 160 (e.g., set screw) passes through a non-threaded counter-sunk hole (not shown) in a first side wall portion of the collar 157', traverses the slot 158', and is threaded into a threaded hole in a second side wall portion of the collar 157'. Tightening the fastener 160 causes the side (e.g., perimeter) wall of the collar 157' to move radially inward, and thus clamp against the inner cam member 150'.

A distal end 164 of the caster stem 152 cooperates with the caster fork 128, which in turn supports the caster wheel 124 for rotation. As stated above, a bearing 166 may be interposed between the caster stem 152 and the caster fork 128 to promote swiveling movement between the caster stem 152 and the caster fork 128. The caster stem 152 may be mounted in relation to the caster fork 128 in a conventional manner, such as with the use of a washer 168 and a fastener 170. A dust cover 172 may be provided for protecting the bearing 166.

Figure 9:
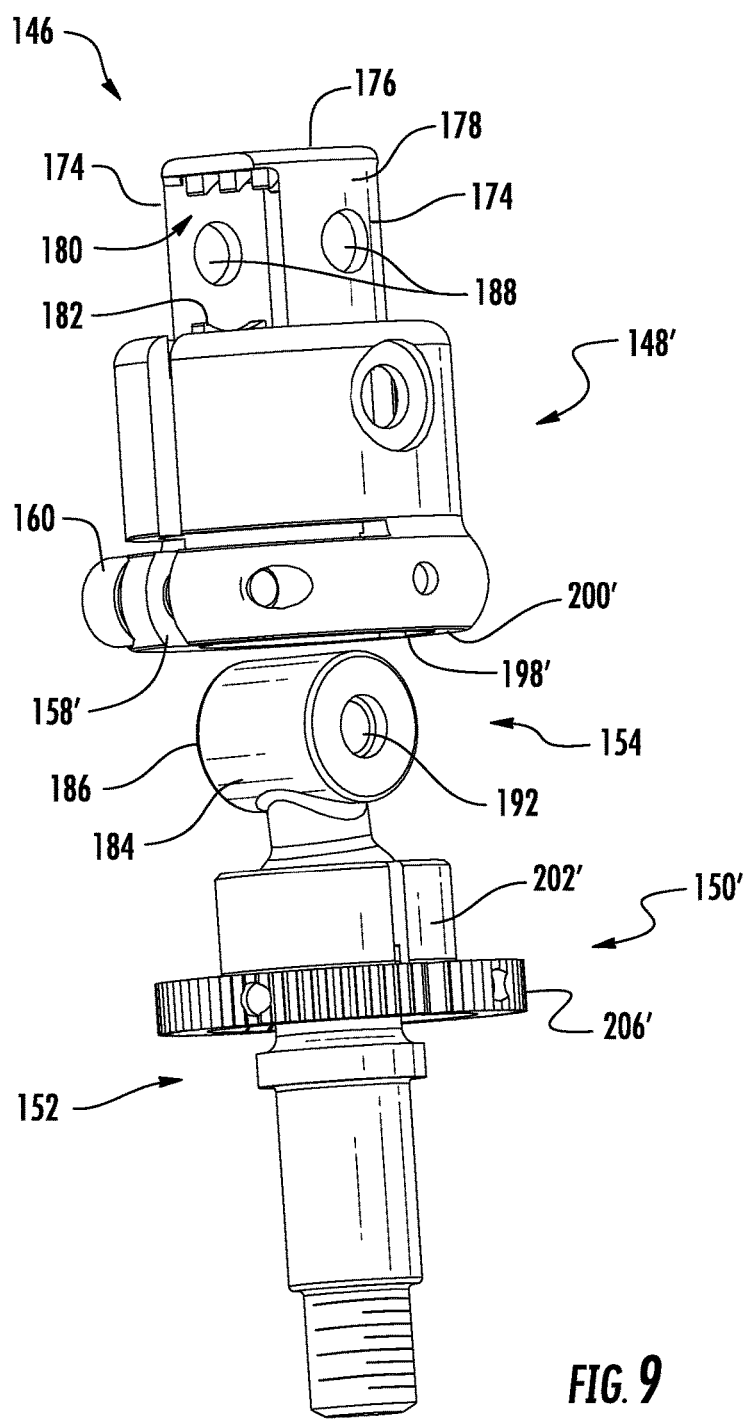
FIG. 9 is an enlarged partially exploded perspective view of the angle adjustment assembly shown in FIGS. 7 and 8.

In reference to FIG. 9, the angle adjustment assembly 140' is shown partially exploded. The illustrated pivot bushing 146 is similar to that described above in that the bushing 146 comprises a clevis, comprising a pair of opposing legs 174, joined together by a link or transverse member 176. Each leg 174 comprises an outer surface 178, which may be curved to conform to the inner surface of the wing tube 126, for a snug fit therein.

An underside of transverse member 176 comprises one or more cam surfaces, hereinafter referred to as the first cam surface, generally indicated at 180. Arcuate formations extending inwardly of the opposing legs 174 form cam surfaces, hereinafter referred to as the second cam surface 182 (also shown in FIG. 11).

The proximal end 154 of the caster stem 152 comprises a substantially cylindrical-shaped portion 184 with opposing ends 186, which form bearing surfaces for engagement with the opposing legs 174 of the pivot bushing 146. The substantially cylindrical-shaped portion 184 is dimensioned and configured to fit in a space bounded between the opposing legs 174. The substantially cylindrical-shaped portion 184 fits snugly between the opposing legs 174 and engages the cam surface 180.

The first cam surface 180 is dimensioned and configured to engage a proximal end of the substantially cylindrical-shaped portion 184. The second cam surface 182 is dimensioned and configured to engage a distal end of the substantially cylindrical-shaped portion 184. It should be appreciated that the first and second cam surfaces 180, 182 are arranged and configured to cooperatively capture the substantially cylindrical-shaped portion 184 therebetween.

The legs 174 are provided with holes 188, which are arranged and configured to register or align with mating holes 190 (shown in FIG. 8) in opposing walls of the wing tube 126 for passage of the fasteners 142. The substantially cylindrical-shaped portion 184 has a threaded hole 192 passing laterally therethrough. The threaded hole 192 passing through the substantially cylindrical-shaped portion 184 registers or aligns with the holes 188 in the legs 174 of the pivot bushing 146 and further with the holes 190 in the wing tube 126. The fasteners 142 (shown in FIG. 8) pass through respective holes 190 in the wing tube 126 and the holes 188 in the legs 174 of the pivot bushing 146, and are threaded in the threaded hole 192. The fasteners 142 function as a pivot dowel, about which the caster stem 152 may pivot. The caster stem 152 pivots about a lateral axis A4 (shown in FIG. 11).

The medial portion 156 of the caster stem 152 defines a ball 194 that fits within a socket 196 defined by the inner cam member 150' (shown in FIG. 11). The ball 194 may be press fit into the socket 196. The caster stem 152 and the inner cam member 150' are shown in an assembled condition in FIG. 9.

Figure 12:
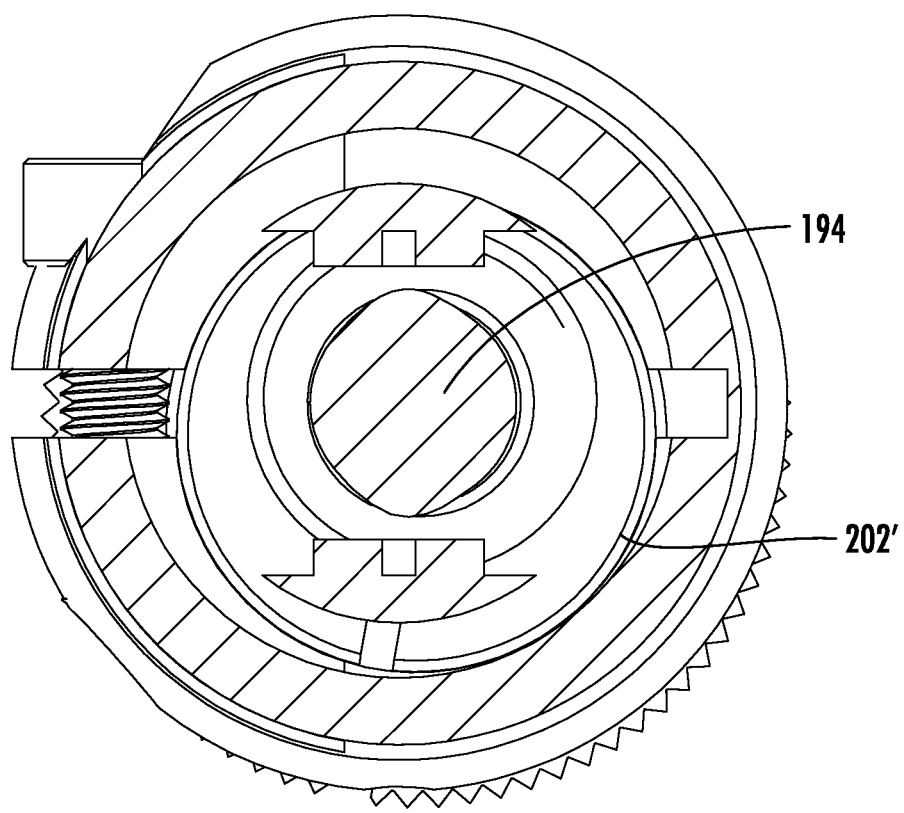
FIG. 12 is a cross-sectional view of the angle adjustment assembly taken along the line 12-12 in FIG. 10 to show an eccentric relationship between parts of the angle adjustment assembly.

The inner cam member 150' nests within the outer cam member 148', as shown in FIGS. 11 and 12. The outer cam member 148' defines an eccentric opening 198 bounded by the perimeter of side wall 200' of the outer cam member 148'. The inner cam member 150' comprises an eccentric surface 202'. Rotation movement of the outer and inner cam members 148', 150' in relation to one another pivotally displaces the caster stem 152, adjusting the angel in the caster stem 152. In this embodiment, the inner cam member 150' has associated therewith a thumbwheel, which may comprise a ribbed periphery, generally indicated at 206'.

In operation, the set screw 160 is loosened to release the clamping effect of the clamping collar 157'. With the set screw 160 loosened, the inner cam member 150' may be rotated in relation to the outer cam member 148'. In doing so, the caster stem 152 pivots about the fasteners 142, about a lateral axis A1.

It should be appreciated that the eccentric configuration of the outer and/or inner cams 148', 150' produces the pivotal movement. That is to say, rotation of the cam members 148', 150', at least one axis A5 of which is not centered, and which is transverse to the lateral pivot axis A1, results in the pivotal movement of the caster stem 152. Once a desired angle for the caster stem 152 is achieved, the fastener or the set screw 160 is tightened to hold the outer and inner cam members 148', 150' in a fixed relation to one another, thus holding the caster stem 152 in the desired position.

An exemplary angle adjustment assembly 210 for supporting a rear wheel 122 of a wheelchair 110 is shown in FIG. 13. The angle adjustment assembly 210 is supported in relation to a camber tube 130, which may be supported in relation to the wheelchair side frame 120 via a hanger 132 (shown in FIG. 1). According to the illustrated embodiment, the angle adjustment assembly 210 is mounted to the camber tube 130 via a fastener 212, such as the dowel pin shown. The angle adjustment assembly 210 supports the rear wheel 122 via a hub and axle assembly 134, which is configured to permit the rear wheel 122 to rotate in relation to the angle adjustment assembly 210.

The angle adjustment assembly 210 comprises a pivot bushing 214, an outer cam member 216, an inner cam member 218, and an axle receiver 220 configured to cooperate with the pivot bushing 214 and the cam members 216, 218. The pivot bushing 214 is dimensioned and configured to be inserted within an open end of the camber tube 130. A proximal end, generally indicated at 222, of the axle receiver 220 is dimensioned and configured to be supported for pivotal movement within the pivot bushing 214. A medial portion 224 of the axle receiver 220 cooperates with the cam members 216, 218 to selectively hold the axle receiver 220 at a desired angle.

According to the illustrated embodiment, the outer cam member 216 comprises a one-piece clamping collar 226 having a slot therein, similar to the collar 157 described above. A fastener 228 (e.g., set screw) passes through a non-threaded counter-sunk hole 230 in a first side wall portion of the collar 226, traverses the slot, and is threaded into a threaded hole in a second side wall portion of the collar 226. Tightening the fastener 228 causes the side (e.g., perimeter) wall of the collar 226 to move radially inward, and thus clamp against the inner cam member 218.

A distal end 232 of the axle receiver 220 cooperates with the rear wheel axle 136 (e.g., via a spring ball locking pin configuration), which in turn supports the rear wheel 122 for rotation. It should be appreciated that a bearing (not shown) may be interposed between the rear wheel axle 136 and the axle hub 138 to promote rotational movement between the rear wheel axle 136 and the rear wheel 122.

The illustrated pivot bushing 214 comprises a clevis, comprising a pair of opposing legs 234, joined together by a link or transverse member 236. Each leg 234 comprises an outer surface 238, which may be curved to conform to the inner surface of the camber tube 130, for a snug fit therein.

The proximal end 222 of the axle receiver 220 comprises a partially cylindrical-shaped portion 240 with opposing flats 241, which form bearing surfaces for engagement with the opposing legs 234 of the pivot bushing 214. The partially cylindrical-shaped portion 240 is dimensioned and configured to fit in a space bounded between the opposing legs 234. The partially cylindrical-shaped portion 240 fits snugly between the opposing legs 234.

The legs 234 are provided with holes 242, which are arranged and configured to register or align with mating holes 244 in opposing walls of the camber tube 130 for passage of the fastener 212. The partially cylindrical-shaped portion 240 has a hole 246 passing laterally therethrough. The hole 246 passing through the partially cylindrical-shaped portion 240 registers or aligns with the holes 242 in the legs 234 of the pivot bushing 214 and further with the holes 244 in the camber tube 130. The fastener 212 passes through respective holes 244 in the camber tube 130 and the holes 242 in the legs 234 of the pivot bushing 214, and further through the hole 246 passing laterally through the partially cylindrical-shaped portion 240. The fastener 212 functions as a pivot dowel, about which the proximal end 222 of the axle receiver 220 may pivot. The axle receiver 220 pivots about a lateral axis A4.

The medial portion 224 of the axle receiver 220 defines a ball 248 that fits within a socket 250 defined by the inner cam member 218 (shown in FIG. 14). The ball 248 may be press fit into the socket 250. The axle receiver 220 and the inner cam member 218 are shown in an assembled condition in FIG. 14.

The inner cam member 218 nests within the outer cam member 216, as shown in FIG. 14. The outer cam member 216 defines an eccentric opening 252 bounded by the perimeter of side wall 254 of the outer cam member 216. The inner cam member 218 comprises an eccentric wall 256. Rotational movement of the outer and inner cam members 216, 218 in relation to one another pivotally displaces the axle receiver 220, adjusting the angle of the axle receiver 220. The outer and inner cam members 216, 218 may each have associated therewith a thumbwheel, which may comprise a ribbed periphery, generally indicated at 258, 260.

In operation, the set screw 228 is loosened to release the clamping effect of the clamping collar 226. With the set screw 228 loosened, the outer and inner cam members 216, 218 may be rotated in relation to one another. In doing so, the axle receiver 220 pivots about the fastener 212, about a lateral axis A4.

It should be appreciated that the eccentric configuration of the outer and inner cams 216, 218 produces the pivotal movement. That is to say, rotation of the eccentric cam members 216, 218, at least one axis A5, A6 of which is not centered, and which are transverse to the lateral pivot axis A4, results in the pivotal movement of the axle receiver 220. Once a desired angle for the axle receiver 220 is achieved, the fastener or the set screw 228 is tightened to hold the outer and inner cam members 216, 218 in a fixed relation to one another, thus holding the axle receiver 220 in the desired position.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. An angle adjustment assembly comprising:
a first member configured to pivot about a first axis,
at least a second member configured to rotate about a second axis transverse to the first axis, the first member being eccentrically supported in relation to the second member so that rotation of the second member produces pivotal movement of the first member, and
at least a third member configured to rotate about a third axis transverse to the first axis, the second axis not aligning with the third axis, the second member being eccentrically supported in relation to the third member so that rotation of the third member further produces pivotal movement of the first member,
wherein the first member comprises a medial portion defining a ball that fits within a socket defined by the inner cam member, and
wherein the second member is an inner cam member and the third member is an outer cam member, the inner cam member being in a nesting relationship with the outer cam member.

2. An angle adjustment assembly comprising:
a first member configured to pivot about a first axis,
at least a second member configured to rotate about a second axis transverse to the first axis, the first member being eccentrically supported in relation to the second member so that rotation of the second member produces pivotal movement of the first member, and
a pivot bushing comprising a clevis comprising a pair of opposing legs joined together by a transverse member, wherein the first member fits snuggly for pivotal movement between the opposing legs,
wherein the first member comprises a partially cylindrical-shaped proximal portion at a proximal end thereof and the pivot bushing comprises a first cam surface engaging a proximal end of the proximal portion and a second cam surface engaging a distal end of the proximal portion, the first and second cam surfaces cooperatively capturing the proximal portion therebetween.

3. An angle adjustment assembly comprising:
a first member configured to pivot about a first axis,
at least a second member configured to rotate about a second axis transverse to the first axis, the first member being eccentrically supported in relation to the second member so that rotation of the second member produces pivotal movement of the first member,
a pivot bushing comprising a clevis comprising a pair of opposing legs joined together by a transverse member, wherein the first member fits snuggly for pivotal movement between the opposing legs, the opposing legs being provided with holes that are arranged and configured to align with holes in opposing walls of a wheelchair tube, the proximal portion having at least one threaded hole passing therethrough and aligning with the holes in the opposing legs and holes in the wheelchair tube, and at least one fastener passing through the holes in the wheelchair tube and the holes in the opposing legs and threaded into the at least one threaded hole, the at least one fastener functions as a pivot dowel about which the first member may pivot about a lateral axis.

4. An angle adjustment assembly comprising:

a first member configured to pivot about a first axis, at least a second member configured to rotate about a second axis transverse to the first axis, the first member being eccentrically supported in relation to the second member so that rotation of the second member produces pivotal movement of the first member, and at least a third member configured to rotate about a third axis transverse to the first axis, the second axis not aligning with the third axis, the second member being eccentrically supported in relation to the third member so that rotation of the third member further produces pivotal movement of the first member, wherein the second member is an inner cam member and the third member is an outer cam member, wherein the first member is eccentrically supported in relation to the inner cam member and the inner cam member is eccentrically supported in relation to the outer cam member, and wherein a proximal end of the first member is supported for pivotal movement by a pivot bushing, which is dimensioned and configured to be supported in relation to a wheelchair tube.

5. The angle adjustment assembly of claim 4, wherein the first member is a caster stem, and a distal end of the caster stem is configured to operatively support a caster wheel in relation to the wheelchair tube.

6. The angle adjustment assembly of claim 4, wherein the first member is an axle receiver, and a distal end of the axle receiver is configured to operatively support a wheelchair drive wheel in relation to the wheelchair tube.

7. An angle adjustment assembly supporting a component in relation to a wheelchair, comprising:

a pivot bushing dimensioned and configured to be inserted within an open end of a wheelchair tube, an inner cam member, an outer cam member comprising:

a one-piece clamping collar having a side wall with a slot therein, and a fastener passing through a hole in a first side wall portion of the collar, traversing the slot, and threading into a threaded hole in a second side wall portion of the collar, and a pivotal member having a proximal end dimensioned and configured to be supported for pivotal movement within the pivot bushing and a medial portion of the pivot member cooperating with the outer and inner cam members to selectively hold an axle receiver at a desired angle, wherein the inner cam member is eccentrically supported within the outer cam member, and the pivotal member is eccentrically supported within the inner member, and wherein rotational movement of the outer and inner cam members in relation to one another pivotally displaces the pivotal member in relation to the pivot bushing, and wherein tightening the fastener causes the side wall of the collar to move radially inward, and thus clamp against the inner cam member to releasably hold the pivotal member in a desired position.

8. The angle adjustment assembly of claim 7, wherein the pivot bushing comprises a clevis, comprising a pair of opposing legs, joined together by a transverse member, each leg comprising an outer surface, which may be curved to conform to an inner surface of the wheelchair tube, for a snug fit therein.

9. The angle adjustment assembly of claim 8, wherein the proximal end of the pivotal member comprises opposing flats, which form bearing surfaces for engagement with the opposing legs of the pivot bushing.

10. The angle adjustment assembly of claim 9, wherein the pivotal member comprises a caster stem, which is configured to support a wheelchair caster assembly.

11. The angle adjustment assembly of claim 9, wherein the pivotal member comprises an axle receiver, which is configured to receive an axle of a wheelchair drive wheel.

12. The angle adjustment assembly of claim 7, wherein the medial portion of the pivotal member defines a ball that fits within a socket defined by the inner cam member, the ball being press fit into the socket.

13. The angle adjustment assembly of claim 7, wherein the outer and inner cam members each have associated therewith a thumbwheel, which comprises a ribbed periphery.

* * * * *